United States Patent [19]
Niehaus et al.

[11] Patent Number: 5,238,750
[45] Date of Patent: Aug. 24, 1993

[54] DRYING CLOTH FOR TRANSPORTATION RECEPTACLES

[75] Inventors: Gottfried Niehaus, Rhede-Vardingholt; Josef Meier, Borken, both of Fed. Rep. of Germany

[73] Assignee: Meier + Niehaus GmbH, Rhede, Fed. Rep. of Germany

[21] Appl. No.: 621,712

[22] Filed: Dec. 5, 1990

[30] Foreign Application Priority Data

Dec. 5, 1989 [DE] Fed. Rep. of Germany ... 8914313[U]

[51] Int. Cl.⁵ .................. B32B 27/00; B32B 23/08
[52] U.S. Cl. ............................ 428/513; 428/249; 428/284; 428/286; 428/913
[58] Field of Search ............ 428/284, 286, 913, 249, 428/513

[56] References Cited

U.S. PATENT DOCUMENTS

| 4,605,401 | 8/1986 | Chmelir et al. | 428/286 |
| 4,775,575 | 10/1988 | Tang | 428/286 |

FOREIGN PATENT DOCUMENTS 2085356A 8/1980 United Kingdom .............. 428/249

Primary Examiner—Jenna L. Davis
Assistant Examiner—Kathryne E. Shelborne
Attorney, Agent, or Firm—Webb, Burden, Ziesenheim & Webb

[57] ABSTRACT

A drying cloth for transportation receptacles is disclosed, which cloth is composed of multilayer sheet material, the two outer sides of which are, in each case, formed by an absorbent layer. An intermediate layer which is impermeable to moisture is arranged between the absorbent layers. The two absorbent layers and the impermeable intermediate layer are permanently interconnected to form a composite material.

3 Claims, 1 Drawing Sheet

_5,238,750_

DRYING CLOTH FOR TRANSPORTATION RECEPTACLES

FIELD OF THE INVENTION

The invention relates to a drying cloth for transportation receptacles and, in particular, for transportation receptacles in which cooled goods are transported.

BACKGROUND OF THE INVENTION

Transportation receptacles of this kind are, for example, containers which are utilized for air-freight purposes.

Cooled and, in particular, deep-frozen goods which are to be transported must be maintained at the necessary cooling temperature, also during protracted transportation times. For this reason, it is standard practice to add dry ice or the like to such goods during transportation, which ensures that the transported goods are maintained at the desired temperature, even during longer transportation and interim storage periods.

Although, in particular in sealed receptacles such as containers, dry ice can maintain the temperature which is desired there for very long periods, the dry ice is used up in the course of time. In so doing, it cannot be prevent that liquid substances, such as water, collect, be this as a result of the fact that the dry ice is being used up, or even as a result of a slight thawing of the frozen and, in particular, deep-frozen transported goods. In order to prevent the liquid water thus produced in the receptacle from adversely affecting the transported goods, it is known to arrange absorbent cloths in the bottom region of containers in which cooled, frozen and, in particular, deep-frozen goods are being transported, which cloths absorb and retain water resulting from the thawing of the dry ice and/or of the transported goods themselves. Although, in this manner, it is possible to absorb and retain the greater part of the accumulated water, it is, however, frequently not possible to prevent that liquid water remains behind, despite the insertion of absorbent drying cloth into the bottom region of a receptacle intended for refrigerated transportation, such as a container.

It was found that a not inconsiderable portion of the liquid water accumulating in a receptacle which is used for refrigerated transportation is condensation water which precipitates on the inside walls of the receptacle and drips down along the walls, i.e., therefore, it does not originate directly from the transported goods and the dry ice which is used as the cooling agent, but can be attributed to the natural atmospheric humidity.

As a result, the amount of water accumulating in a receptacle for refrigerated transportation during transportation and, in particular, during lengthy transportation, is relatively great, with the result that the water which is accumulated as a whole can be absorbed only inadequately by the inserted drying cloths. In this regard, it was found that the proportion of condensation water is frequently greater than the proportion of water resulting from thawing.

SUMMARY OF THE INVENTION

The object of the invention is to provide a drying cloth for transportation receptacles and, in particular, for receptacles which are intended for the transportation of cooled, frozen and deep-frozen goods, with the aid of which drying cloth it is prevented that condensation water and water resulting from thawing can converge.

Briefly according to this invention, there is provided a drying cloth for transportation receptacles, which is composed of a multilayer sheet material, the two outer sides of which are, in each case, composed of an absorbent layer, between which an intermediate layer, which is impermeable to moisture, is arranged. Preferably, the two absorbent layers and the impermeable intermediate layer are permanently interconnected to form a composite material. According to one embodiment, the two absorbent layers are composed of a bonded fabric. According to another embodiment, the two absorbent layers are composed of a cellulose-fibre fabric. Preferably, the impermeable intermediate layer is a plastic sheet. Most preferably, the impermeable intermediate layer is a sheet of thermoplastic. According to one embodiment, the impermeable intermediate layer is a sheet of polyethylene.

The multilayer sheet material according to the invention can be placed in position as a lining in a receptacle for cooled or frozen goods, it being immaterial as to which side of the sheet material faces outwards and which side faces inwards, since the outer absorbent layers or coats thereof are preferably designed to be identical and have the same thickness and, therefore, identical absorbency and absorptive capacity. By means of this drying cloth, both the condensation water which is present on the receptacle wall and the water which is released by thawing, are effectively absorbed and retained, although, of course, separately from one another, such that no uncontrollable free water accumulates in the receptacle. Upon completion of the transportation activity and the evacuation of the receptacle, the drying cloth according to the invention is removed and dried, whereupon it is again available for further use.

Although it is possible to line a receptacle completely with the drying cloth according to the invention, it is also sufficient when said receptacle is lined or covered only partially with said drying cloth. Under certain circumstances, it is sufficient when the drying cloth according to the invention is placed merely on the floor of the receptacle, for it to fulfill its desired function. In this case, too, the condensation water dripping down along the inside walls of the receptacle is absorbed by the outer layer of the drying cloth, while the water which originates directly from the transported goods and/or the cooling agent is retained by the inner layer.

A simple drying cloth is provided by the invention, which cloth is manufactured economically and absorbs the water accumulating in a receptacle for the transportation of cooled or frozen goods such that the water which is released by the transported goods and by the cooling agent does no mix with the condensation water which drips down along the walls of the receptacle. In addition, this drying cloth has a greater absorptive capacity than known single or mono-layer drying cloths.

THE DRAWINGS

An exemplified embodiment of a drying cloth according to the invention is illustrated in the drawing in a diagrammatic form of a part thereof and not true to scale.

DESCRIPTION OF THE PREFERRED EMBODIMENTS

Figure 1:
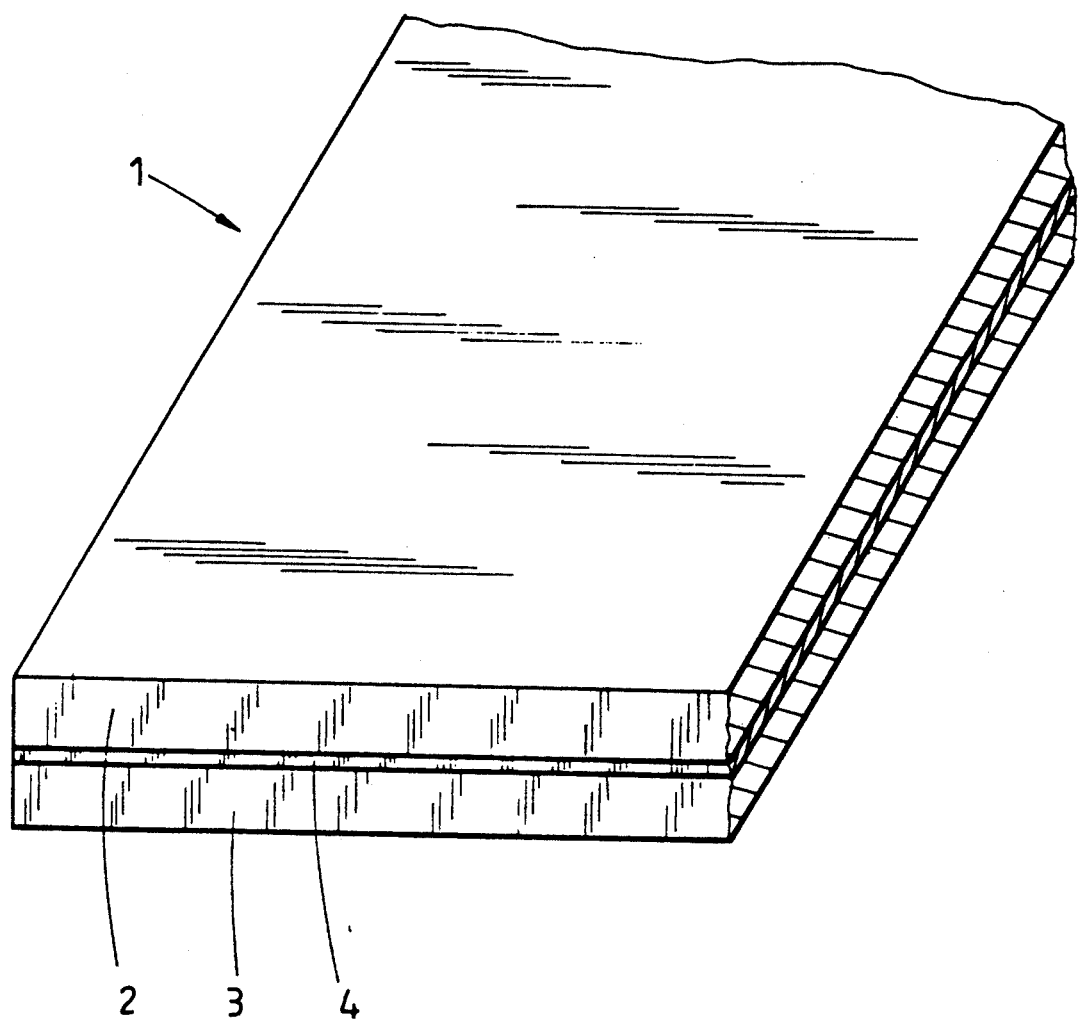

The drying cloth (1) shown in the drawing can be provided in the form of piece goods or sold by the meter, in which case it is in rolled-up form. This drying cloth (1) is designed as a three-layer composite structure, as is shown in the drawing.

The two outer layers (2 and 3) are, in each case, composed of absorbent material, being, in the case of the exemplified embodiment illustrated, a bonded fabric which is preferably manufactured from cellulose fibres, such as cotton fibres, i.e. it is a paper fabric. A material of this kind is cheap and can manifest good absorbency and absorptive capacity.

The two absorbent layers (2 and 3) are separated by a middle layer (4) which is composed of a plastic sheet which is impermeable to moisture. The plastic sheet (4) holds the outer layers (2 and 3) together, said outer layers being, for example, glued or lined on to the plastic sheet. The intermediate layer (4) is preferably composed of a sheet of thermoplastic plastics. It is particularly advantageous when the intermediate layer (4) is composed of polyethylene.

According to practical exemplified embodiment of the invention, the drying cloth (1) has a weight per unit area of about 250 g/m$^2$, the weight per unit area of each of the two outer layers (2 and 3), which are composed of cellulose fabric, being about 100 g/m$^2$, and the weight per unit area of the sheet-like intermediate layer being about 50 g/m$^2$.

We claim:

1. A drying cloth for use in the interior of a transportation receptacle for the transportation of frozen goods, wherein said drying cloth separately absorbs condensation water in said receptacle interior and water from thawing of said goods, said drying cloth comprised of two outer layers formed of absorbent material with a water impermeable intermediate layer between said outer layers, said outer and intermediate layers are permanently interconnected to form a composite material, wherein said condensation water absorption occurs in one of said outer layers and said thawed water absorption occurs in the other of said outer layers and said intermediate layer maintains separation between said condensation water and said thawed water, wherein said two outer layers are formed of cellulose fabric having a weight per unit area of 100 g/m$^2$ and said intermediate layer is a plastic sheet having a weight per unit area of 50 g/m$^2$.

2. The drying cloth of claim 1 wherein the two outer layers are glued to said intermediate layer.

3. The drying cloth of claim 2 wherein said outer layers are composed of a bonded fabric manufactured from cotton fibres.

* * * * *